United States Patent [19]

Takai et al.

[11] Patent Number: 4,712,212
[45] Date of Patent: Dec. 8, 1987

[54] TERMINAL CONTROL DEVICE FOR REFERENCE STATION IN TDMA SATELLITE COMMUNICATION SYSTEM

[75] Inventors: Haruki Takai; Mikio Ujiie; Hideki Nakamura, all of Tokyo, Japan

[73] Assignee: NEC Corporation, Japan

[21] Appl. No.: 820,602

[22] Filed: Jan. 21, 1986

[30] Foreign Application Priority Data

Jan. 24, 1985 [JP] Japan ................... 60-9815[U]

[51] Int. Cl.$^4$ .............................................. H04J 3/06
[52] U.S. Cl. ..................................... 370/104; 375/107
[58] Field of Search ................ 370/100, 104; 375/114, 375/118, 119, 120, 107

[56] References Cited

U.S. PATENT DOCUMENTS 4,054,753 10/1977 Kaul et al. ........................... 375/107
4,346,470 8/1982 Alvarez, III et al. ............. 370/104

Primary Examiner—Douglas W. Olms
Assistant Examiner—Wellington Chin
Attorney, Agent, or Firm—Laff, Whitesel, Conte & Saret

[57] ABSTRACT

A terminal control device for a reference station in a TDMA satellite communication system includes means for generating a parallel acquisition window applicable to a parallel initial acquisition system and a sequential acquisition window applicable to a sequential initial acquisition system each in a TDMA frame, and selector means for selecting either one of the two different kinds of windows. The device selectively uses the two different acquisition systems and, thereby, accomplishes the advantages of both of the systems at the same time, i.e. short terminal buildup time and high TDMA frame utilization efficiency.

1 Claim, 7 Drawing Figures

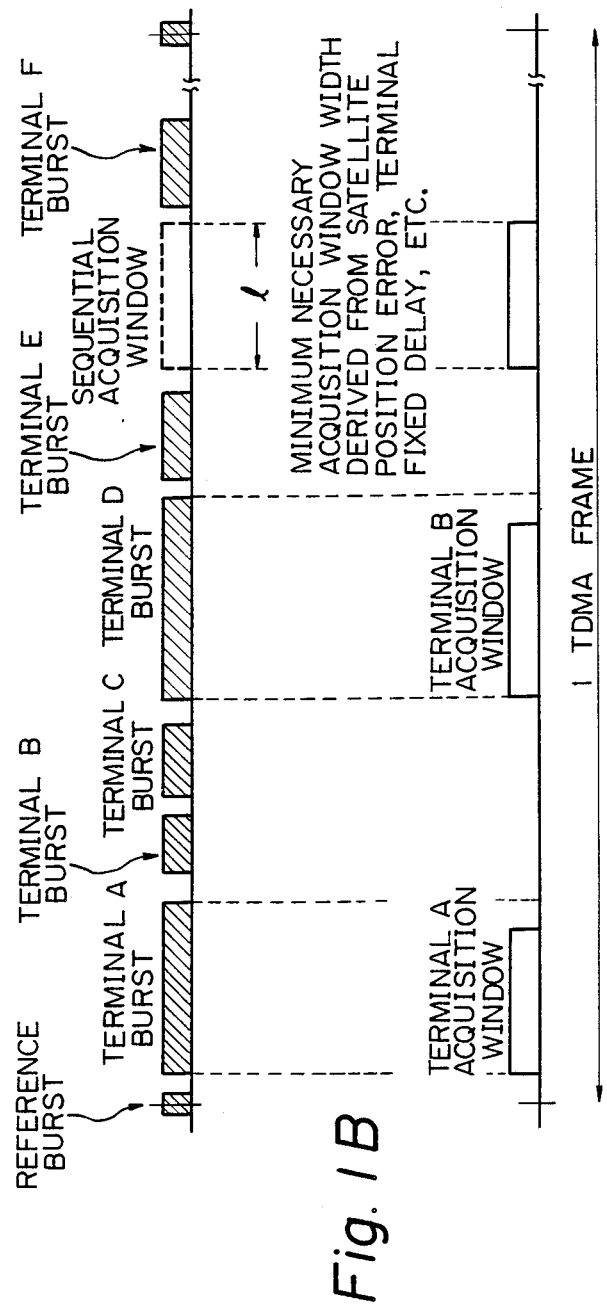

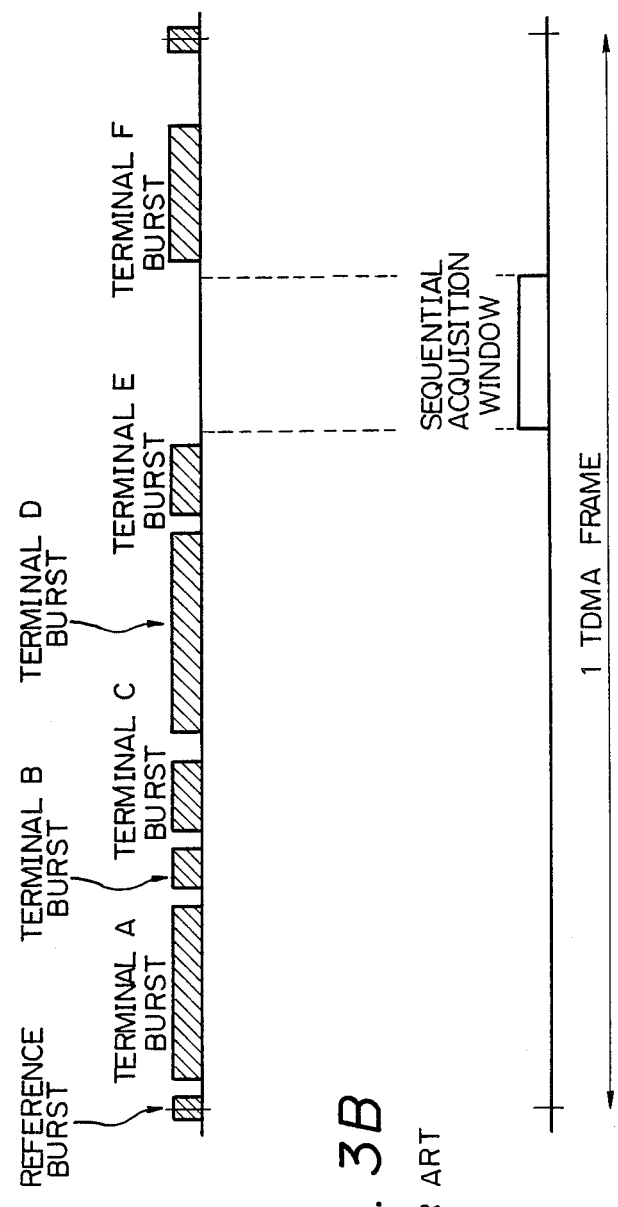

TERMINAL CONTROL DEVICE FOR REFERENCE STATION IN TDMA SATELLITE COMMUNICATION SYSTEM

BACKGROUND OF THE INVENTION

The present invention relates to a terminal control device for a reference station in a time division multiple access (TDMA) satellite communication system. More particularly, the present invention is concerned with a terminal control device usable for regular synchronization control and initial acquisition control which are performed by a reference station on TDMA terminals, the latter control preceding the former control.

As well known in the art, a TDMA communication system includes a reference station and a plurality of earth stations, or terminals, and uses a TDMA frame which is divided into time slots which are assigned one to each earth station. Each earth station transmits a burst of its own within a particular one of the time slots which is assigned thereto. The reference station, therefore, has to constantly supervise the terminals so that the bursts sent from the various terminals may each be confined in the time slot assigned to the associated terminal. Such a control, which is generally referred to as a transmit burst synchronization control, is one of those basic functions which are fulfilled by a reference station.

In an initial state before a certain earth station, or terminal, sends a burst, the precise timing at which the burst should be sent is unknown and, hence, initial acquisition control is needed in order to determine that timing. Specifically, in a TDMA satellite communication system, a reference station starts controlling a certain terminal after performing initial acquisition control prior to regular synchronization control. During the initial acquisition control, the reference station provides a wide exclusive acquisition window for this particular control in a receive frame thereof so as to supply the intended terminal with satellite position information, reference station position information, and timing information derived from the position of the intended terminal and other factors. In response, the terminal sends a burst of its own as instructed by the timing information.

Confirming reception of the burst from the terminal in the acquisition window, the reference station prepares new timing information based on a difference between the time base associated with the burst reception and the time base associated with the regular synchronization control, the new timing information being sent to the terminal. At the same time, the reference station cancels the acquisition window in the receive TDMA frame and, instead, sets up a window in a regular synchronization control position. In this condition, when the terminal sends a burst responsive to the timing information, the reference station receives it in the regular synchronization window.

Here, the prerequisite is that the exclusive window for the initial acquisition control in the TDMA frame be wider than a certain one partly because error in the satellite position and fixed delay particular to a terminal are unknown. Initial acquisition control systems known in the art may generally be classified into two types with respect to the treatment of the window, i.e., a so-called parallel acquisition type and a so-called sequential acquisition type. The parallel acquisition type system is such that TDMA terminals which are controlled by a single reference station have individual acquisition windows in a TDMA frame. The sequential acquisition type system is such that the terminals share a common acquisition window in a TDMA frame.

The prior art initial acquisition system, whether it be parallel or sequential, has problems left unsolved. Specifically, the problem with the parallel acquisition scheme is that the reference station has to define acquisition windows in a TDMA frame which are assigned one to each of the controlled terminals. Such multiple acquisition windows limit the number of terminals which may be controlled by a common reference station as well as the length of a burst which each terminals may send, thereby degrading the TDMA frame utilization efficiency to a critical degree. The sequential acquisition scheme, on the other hand, enhances efficient use of a TDMA frame because a reference station needs only a single acquisition window in a TDMA frame with no regard to the number of controlled terminals. However, due to the single acquisition window, the reference station is incapable of starting on initial acquisition control for a plurality of terminals at the same time. For this reason, when the satellite communication link is cut off due to some failure in the TDMA communication network, the sequential acquisition scheme requires a far longer period of time than the parallel acquisition scheme to recover the link by enabling all the associated terminals. In addition, the period of time necessary for the link to recover is proportional to the number of terminals which was controlled by the reference station. Such is contradictory to the advantage particular to the sequential acquisition system, i.e. the capability for controlling a great number of terminals with enhanced TDMA frame utilization efficiency.

SUMMARY OF THE INVENTION

It is therefore an object of the present invention to provide a terminal control device for a reference station in a TDMA satellite communication system which s capable of selectively using the parallel acquisition system and the sequential acquisition system to accomplish the merits of both of the systems.

A terminal control device for a TDMA satellite communication system which includes a reference station and a plurality of TDMA terminals and causing the reference station to perform regular synchronization control and initial acquisition control for each of the terminals of the present invention comprises a window information generator for generating information to select particular information and a particular acquisition mode responsive to a burst arrangement of the reference station and the terminals in a TDMA frame, a regular window generator for generating information for providing a regular synchronization control window in each of regular synchronization positions of the respective terminals in the TDMA frame, a parallel acquisition control window generator for generating information for providing an acquisition window particular to any one of the terminals in an acquisition control position in the TDMA frame which s particular to the terminal, a sequential acquisition control window generator for generating information for providing a common acquisition window in the TDMA frame which is shared by at least two of the terminals, a window selector for selecting one of the informations which are representative of the three terminal control windows, a burst receiver for receiving a burst which is sent from each of the terminals to detect a synchronizing code in the burst, a receive timing generator for setting up a time reference for reception at the reference station responsive to a reference burst detection output which is produced by the burst receiver and, thereby, generating various timings which the device uses, a burst detector for detecting whether or not a burst from any of the terminals has been received in any of the terminal control windows, and burst position error information, and a control information generator for generating control information for the terminals responsive to burst receive state information which is outputted by the burst detector.

In accordance with the present invention, a terminal control device for a reference station in a TDMA satellite communication system includes means for generating a parallel acquisition window applicable to a parallel initial acquisition system and a sequential acquisition window applicable to a sequential initial acquisition system each in a TDMA frame, and selector means for selecting either one of the two different kinds of windows. The device selectively uses the two different acquisition systems and, thereby, accomplishes the advantages of both of the systems at the same time, i.e. short terminal buildup time and high TDMA frame utilization efficiency.

The above and other objects, features and advantages of the present invention will become more apparent from the following detailed description taken with the accompanying drawings.

BRIEF DESCRIPTION OF THE DRAWINGS

FIGS. 1A and 1B show an arrangement of bursts in a TDMA frame which may be implemented in accordance with the present invention;

FIGS. 3A and 3B show an arrangement of bursts in a TDMA frame which may be provided in accordance with the prior art sequential acquisition system.

DESCRIPTION OF THE PREFERRED EMBODIMENT

While the terminal control device for a reference station in a TDMA satellite communication system of the present invention is susceptible of numerous physical embodiments, depending upon the environment and requirements of use, a substantial number of the herein shown and described embodiment have been made, tested and used, and all have performed in an eminently satisfactory manner.

To better understand the present invention, a brief reference will be made to prior art initial acquisition control techniques.

Referring to FIG. 1A, there is shown an exemplary burst arrangement in one TDMA frame. Assuming that an acquisition window having a width l at the minimum is needed in the TDMA frame in order to compensate for satellite position errors, terminal fixed delays and others, terminals A and D can accommodate it in their regular synchronous burst positions. However, the other terminals B, C, E and F are incapable of accommodating the width l in their regular synchronous burst positions and, therefore, having individual parallel acquisition windows.

Figures 2A, 2B:
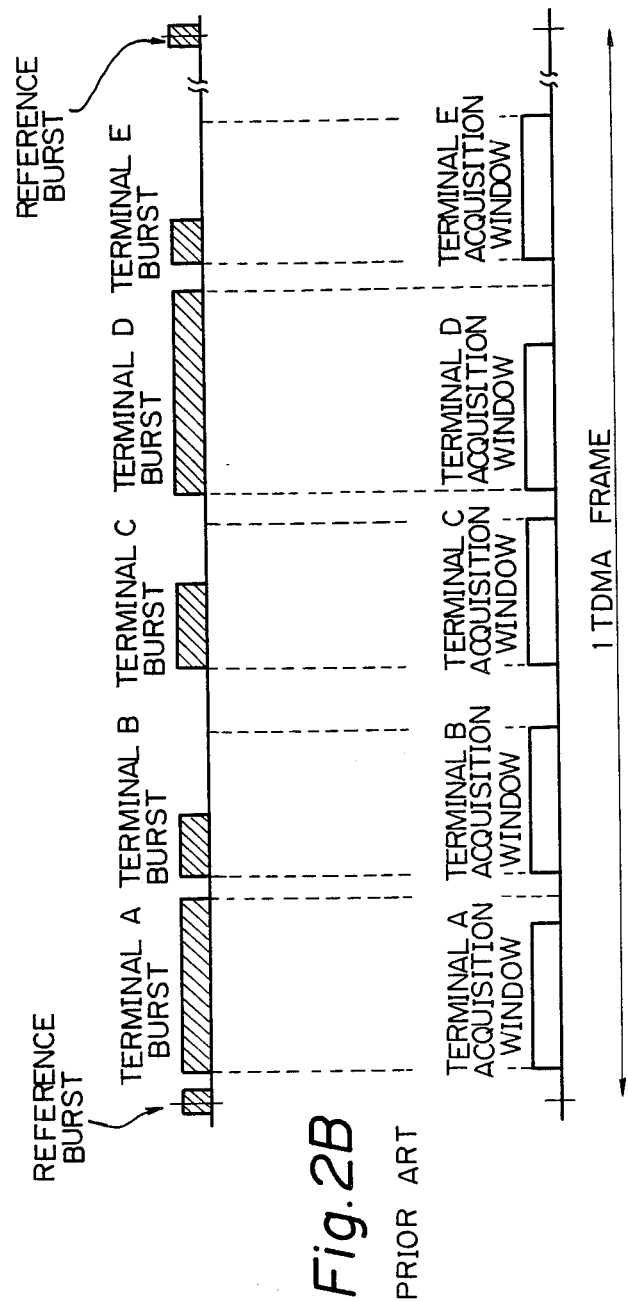
FIGS. 2A and 2B show an arrangement of bursts in a TDMA frame which may be provided in accordance with the prior art parallel acquisition system.

Only two implementations have heretofore been available to settle the above situation. One of them is rearranging the bursts as shown in FIG. 2A so that each burst may have a width greater than the width l of the acquisition window as shown in FIG. 2B, thereby employing the parallel acquisition system at the sacrifice of TDMA frame utilization efficiency. The other is, as shown in FIGS. 3A and 3B, employing the sequential acquisition system sacrificing the time at the instant of buildup of each terminal.

The principle of the present invention resides in that, taking FIGS. 1A and 1B for example, the parallel acquisition system with parallel acquisition windows are selected for the terminals A and D and the sequential acquisition system with a sequential acquisition window for the terminals B, C, E and F.

Figure 4:
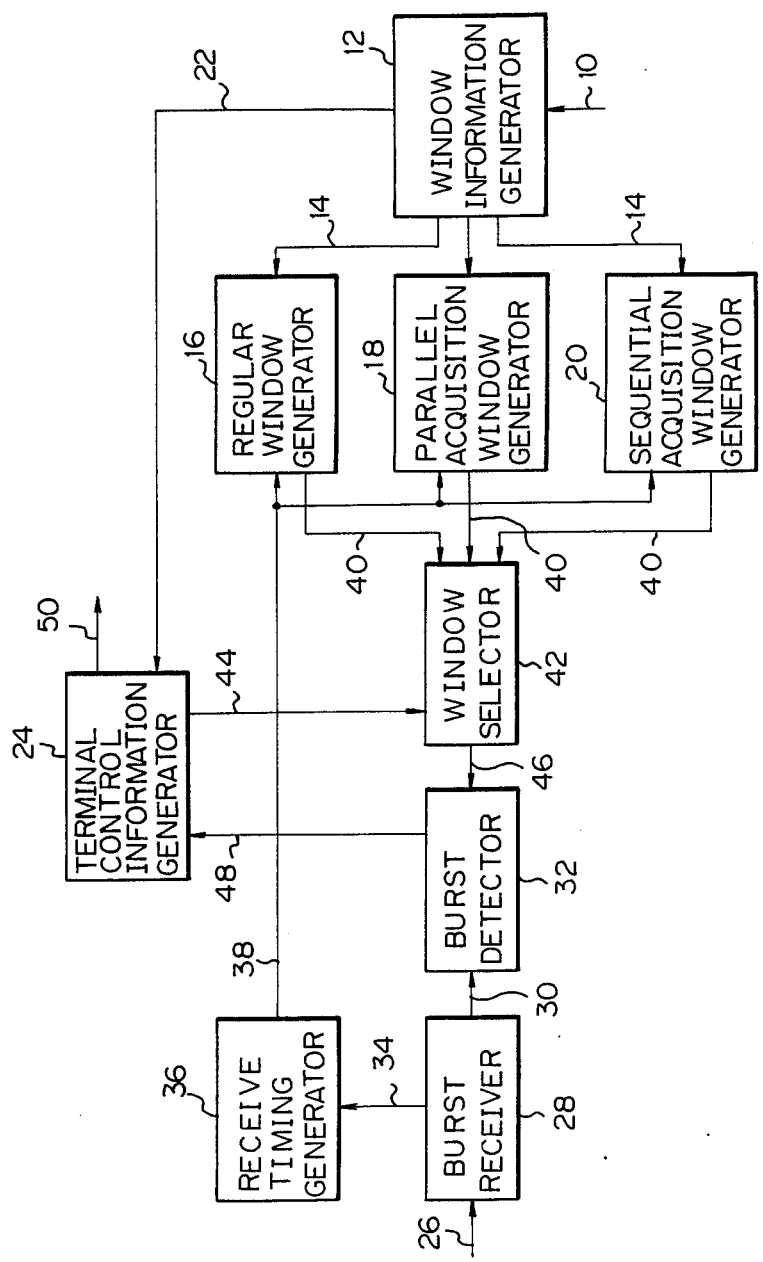
FIG. 4 is a block diagram of a terminal control device for a reference station in a TDMA satellite communication system embodying the present invention.

Referring to FIG. 4, a terminal control device for a reference station in a TDMA satellite communication system embodying the present invention is shown in a block diagram. As shown, the control device includes a window information generator 12 which is supplied with a burst arrangement, a number of bursts, burst lengths and other burst arrangement information 10. Manipulating the input information 10, the window information generator 12 generates optimum window information for initial acquisition control and an optimum initial acquisition control mode, or method, and window information for regular synchronization. The window information 14 outputted by the generator 12 is fed to a regular window generator 16, a parallel acquisition window generator 18, and a sequential acquisition window generator 20. At the same time, information 22 for selecting burst arrangement information, window information and initial acquisition control mode is fed from the generator 12 to a terminal control information generator 24.

Meanwhile, a burst which the reference station received is applied to a burst receiver 28. The burst receiver 28 functions to deliver received burst information 30 to a burst detector 32 and a reference burst detection signal 34 to a receive timing generator 36. Responsive to the reference burst detection signal 34, the receive timing generator 36 sets up a TDMA frame period and delivers a receive frame timing 38 to each of the regular window generator 16, parallel acquisition window generator 18, and sequential acquisition window generator 20. Referencing the receive frame timing 38, each of the window generators 16, 18 and 20 applies information representative of a window position in a TDMA frame to a window selector 42.

The terminal control information generator 24 supplies the window selector 42 with window selection information 44 which is associated with a control state of each terminal. Responsive to the information, the window selector 42 selects any of the window position informations 40 which are outputted by the window generators 16, 18 and 20, the selected information being routed to the burst detector 32 as window position information 46. Based on this information 46, the burst detector 32 detects a burst receive state, a burst position error for which the window constitutes a reference, and others terminal by terminal out of the receive burst information 30. The output 48 of the burst detector 32, or receive state information, is routed to the terminal control information generator 24. That is, the terminal control information generator 24 references the window select information 44 to form in a TDMA frame a window which matches with a particular control state of each terminal and, based on the burst receive state information 48 associated with that window, prepares and sends new terminal control information 50. The information 50 is reflected in the content of a reference burst, which the reference station sends, and transmitted to the terminal under control.

As described above, in the illustrative embodiment, a parallel acquisition mode and a sequential acquisition mode are selectively used for initial acquisition control depending upon the entered burst arrangement, number of bursts, burst lengths, etc. With this principle, the device achieves the merit particular to the parallel acquisition system and that particular to the sequential acquisition system at the same time.

If desired, the window information generator 12 may be omitted and, instead, the burst arrangement information, window information and information for the selector of an acquisition mode may be supplied from the outside.

In summary, it will be seen that the present invention provides a terminal control device for a TDMA satellite communication system which allows a reference station to optimumly control terminals with only the advantages of the prior art parallel acquisition system and sequential acquisition system preserved. Specifically, the device of the present invention selects a particular acquisition window and an acquisition mode which are optimum for the burst lengths and a number of bursts associated with the terminals, without degrading the TDMA frame utilization efficiency. Another and unprecedented advantage attainable with the present invention is that upon failure of a TDMA satellite communication link the terminals can be rapidly enabled to recover the link within a short period of time.

Various modifications will become possible for those skilled in the art after receiving the teachings of the present disclosure without departing from the scope thereof.

What is claimed is:

1. A terminal control device for a TDMA satellite communication system which includes a reference station and a plurality of TDMA terminals and causing the reference station to perform regular synchronization control and initial acquisition control for each of the terminals, said device comprising:

a window information generator for generating information to select particular information and a particular acquisition mode responsive to a burst arrangement of the reference station and the terminals in a TDMA frame;

a regular window generator for generating information for providing a regular synchronization control window in each of regular synchronization positions of the respective terminals in the TDMA frame;

a parallel acquisition control window generator for generating information for providing an acquisition window particular to any one of the terminal sin an acquisition control position in the TDMA frame which is particular to said terminal;

a sequential acquisition control window generator for generating information for providing a common acquisition window in the TDMA frame which is shared by at least two of the terminals;

a window selector for selecting one of the informations which are representative of said three terminal control windows;

a burst receiver for receiving a burst which is sent from each of the terminals to detect a synchronizing code in the burst;

a receive timing generator for setting up a time reference for reception at the reference station responsive to a reference burst detection output which is produced by said burst receiver and, thereby, generating various timings which the device uses;

a burst detector for detecting whether or not a burst from any of the terminals has been received in any of the terminal control windows, and said burst detector further detecting burst position error information; and a control information generator for generating control information for the terminals responsive to burst receive state information which is outputted by said burst detector.

* * * * *